United States Patent [19]

Ueda

[11] Patent Number: 5,742,742
[45] Date of Patent: Apr. 21, 1998

[54] PRINTING SYSTEM FOR DETERMINING IF THERE IS ENOUGH MEMORY TO STORE REVISED PROGRAM AND CONTROLLING THE SYSTEM USING CONTROL PROGRAM WITH THE REVISED PROGRAM

[75] Inventor: Shigeru Ueda, Wako, Japan

[73] Assignee: Canon Kabushiki Kaisha, Tokyo, Japan

[21] Appl. No.: 246,562

[22] Filed: May 20, 1994

Related U.S. Application Data

[63] Continuation of Ser. No. 872,149, Apr. 22, 1992, abandoned.

[30] Foreign Application Priority Data

Apr. 22, 1991 [JP] Japan .................. 3-119229
Apr. 9, 1992 [JP] Japan .................. 4-088846

[51] Int. Cl.$^6$ .................................... G06F 13/00
[52] U.S. Cl. .................. 395/109; 395/115; 395/712; 395/508
[58] Field of Search .................. 395/109, 425, 395/148, 712, 508; 365/189; 364/518, 466, 154

[56] References Cited

U.S. PATENT DOCUMENTS

| | | | |
|---|---|---|---|
| 4,319,343 | 3/1982 | Powell | 365/189 |
| 4,498,151 | 2/1985 | Henry | 364/900 |
| 4,649,490 | 3/1987 | Manduley et al. | 364/466 |
| 4,742,485 | 5/1988 | Carlson et al. | 395/148 |
| 4,769,767 | 9/1988 | Hilbrink | 364/200 |
| 4,847,641 | 7/1989 | Tung | 346/154 |
| 4,902,146 | 2/1990 | Ishikawa | 400/61 |
| 4,905,140 | 2/1990 | Sakakibara et al. | 364/200 |
| 5,027,304 | 6/1991 | Jeng et al. | 364/518 |
| 5,101,490 | 3/1992 | Getson, Jr. et al. | 395/425 |
| 5,402,528 | 3/1995 | Christopher et al. | 395/109 |

FOREIGN PATENT DOCUMENTS

2195800  4/1988  United Kingdom.

*Primary Examiner*—Thomas C. Lee
*Assistant Examiner*—Le Hien Luu
*Attorney, Agent, or Firm*—Fitzpatrick, Cella, Harper & Scinto

[57] ABSTRACT

A printing apparatus comprises a transfer means for transferring a new data from outside of the printing apparatus, a storing means for storing the new data transferred by said transfer means, and a control means for controlling said printing apparatus based on the data prestored in said printing apparatus and the new data stored in said storage means.

9 Claims, 7 Drawing Sheets

PRINTING SYSTEM FOR DETERMINING IF THERE IS ENOUGH MEMORY TO STORE REVISED PROGRAM AND CONTROLLING THE SYSTEM USING CONTROL PROGRAM WITH THE REVISED PROGRAM

This application is a continuation of application Ser. No. 07/872,149 filed Apr. 22, 1992 now abandoned.

BACKGROUND OF THE INVENTION

1. Field of the Invention

The present invention relates to a printing apparatus for printing information, such as document or graphics information, which is input from an external apparatus or a host computer, with a laser beam method.

2. Related Background Art

Conventionally, printing apparatuses have been known in which a control program, consisting of a plurality of tasks for controlling a printing apparatus, is prestored, and the print information is printed based on the control program.

In such a printing apparatus, when a bug was detected in any task of the control program during operation, or when the control program was updated to the latest version, it was necessary for the serviceman to go to the user's site to disassemble the printer and exchange the program ROM storing the control program.

In such a case, when the program ROM was directly soldered to a print substrate rather than using a socket, the entire print substrate had to be replaced at the user's site.

Accordingly, the conventional printing apparatus, as described above, had a problem that whenever a bug occurred in any task of the control program, or when the control program needed to be updated to the latest version, it was necessary to disassemble the printer and to exchange the entire print substrate, including the program ROM. This aspect led to many problems in disassembling, and a long period of time was necessary for the exchange work as the entire print substrate needed to be exchanged, thereby resulting in a high cost.

Also, in a conventional printing apparatus, as described above, when a bug occurred in any task of the control program, or when the control program was updated to the latest version, a ROM card or the like, which was a storage medium detachably mounted on a printer, was packaged into the printer to store a new control program within the ROM card (in a memory such as a ROM) which was a storage medium within the printer. When the capacity of the new program within the detachable ROM card was greater than that of the program storage area in the memory (such as a ROM) within the printer, the new program within the ROM card could not be stored in the memory within the printer, resulting in a problem, for example, wherein the bug correction or the updating of versions for the control program could not be made.

SUMMARY OF THE INVENTION

In the light of the foregoing problems, the present invention aims to provide a printing apparatus in which when a bug occurs in any task of the control program, or when the control program is updated to the latest version, the bug can be corrected easily and securely, or the control program can be updated to the latest version, without disassembling the printing apparatus, thereby simplifying maintenance operations and decreasing the cost of such maintenance.

Further, in light of the foregoing, the present invention aims to provide a printing apparatus in which even when the capacity of a new program within a detachable ROM card is greater than that of the program storage area in the memory (such as a ROM) within the printing apparatus, the bug correction and the updating of versions for the control program, for example, can be made, without storing the new control program within the ROM card in the memory (such as a ROM) within the printing apparatus, so that the maintenance operation is simplified and the cost is decreased.

To solve such problems, a printing apparatus according to the present invention comprises transfer means for transferring new data from outside the printing apparatus, storing means for storing the new data transferred by the transfer means, and control means for controlling the printing apparatus, based on data prestored in the printing apparatus and on the new data stored in the storage means.

To solve such problems, a printing method according to the present invention includes a transfer process for transferring new data from outside the printing apparatus, a storing process for storing the new data transferred by the transfer process, and a control process for controlling the printing apparatus based on data prestored in the printing apparatus and the new data stored in the storage means.

To accomplish the above objects, it is desirable that the transfer means and process is constituted by a ROM card, which is a storage medium detachably mounted on the printing apparatus, or an EEPROM, which is a writable, nonvolatile storage medium in the printing apparatus, or a host computer which is an external apparatus for transferring the data into the printing apparatus. The storing means and process is constituted by an EEPROM, which is a writable, nonvolatile storage medium, in the printing apparatus.

Further, to solve such problems, a printing apparatus according to the present invention comprises storing means for storing new data in a storage medium detachable from the printing apparatus, determining means for determining whether the new data can be stored in the storing means within the printing apparatus, and control means for controlling the printing apparatus based on the new data stored in the detachable storage medium and on data prestored in the printing apparatus, if the storing of the new data is determined by the determining means to be impossible.

Further, to solve such problems, a printing method according to the present invention includes a storing process for storing new data in a storage medium detachable from a printing apparatus, a determining process for determining whether the new data can be stored in the printing apparatus, and a control process for controlling the printing apparatus based on the new data stored in the detachable storage medium and on data prestored in the printing apparatus, if the storing of the new data is determined in the determining process to be impossible.

Also, to accomplish the above objects, it is desirable that the storing means is constituted by a writable, nonvolatile storing means.

In a printing apparatus according to the present invention, transfer means transfer new data from outside the printing apparatus, storing means store the new data transferred by the transfer means, and control means control the printing apparatus based on data prestored in the printing apparatus and on the new data stored in the storing means.

In a printing method according to the present invention, a transfer process transfers new data from outside the printing apparatus, a storing process stores the new data transferred by the transfer process, and a control process controls the printing apparatus based on data prestored in the printing apparatus and on the new data stored in the storing process.

In this way, it is possible to correct a bug occurring in any task of the control program easily, securely and rapidly and to update the control program to the latest version easily, securely and rapidly.

Also, in a printing apparatus according to the present invention, determining means determine whether new data, in a storage medium that is detachable from the printing apparatus, can be stored into the writable, nonvolatile storing means within the printing apparatus, and control means control the printing apparatus based on the new data stored in the detachable storage medium and on data prestored in the printing apparatus, if the storing of the new data is determined by the determining means to be impossible.

Also, in a printing method according to the present invention, a determining process determines whether or not new data in a storage medium detachable from the printing apparatus can be stored into the writable, nonvolatile storing means within the printing apparatus, and a control process controls the printing apparatus based on the new data stored in the detachable storage medium and on data prestored in the printing apparatus, if the storing of the new data is determined by the determining process to be impossible.

Thereby, even when the capacity of the new program within the ROM card, which is a detachable storage medium, is greater than that of the program storage area in the memory (such as an EEPROM) within the printing apparatus, bug correction and the updating of the version for the control program can be accomplished, without storing the new control program within the ROM card into a memory (such as a ROM) within the printing apparatus, so that the maintenance operation is simplified and a decreased cost can be realized.

As explained above, in a printing apparatus according to the present invention, when a bug occurs in any task of a prestored control program consisting of a plurality of tasks, a bug corrected program with the bug corrected is transferred from outside of the printing apparatus, by the transfer means, and is stored in the storing means, whereby when a bug occurs in any task of the control program, it is possible to correct the bug easily, securely and rapidly, without disassembling the printing apparatus. This feature provides great reductions in the cost and the time required to correct a bug, with the provision of minute countermeasures against the bug.

Further, even when the capacity of the new program within the ROM card, which is a storage medium detachable from the printing apparatus, is greater than that of the program storage area in the memory (such as an EEPROM) within the printing apparatus, bug correction and updating of the version of the control program, for example, can be made, without storing the new control program within the ROM card into a memory, such as EEPROM, within the printing apparatus, so that the simplified maintenance operation and a decrease in cost can be realized.

DESCRIPTION OF THE PREFERRED EMBODIMENT

The embodiments of the present invention will be described below with reference to the drawings.

Figure 1:
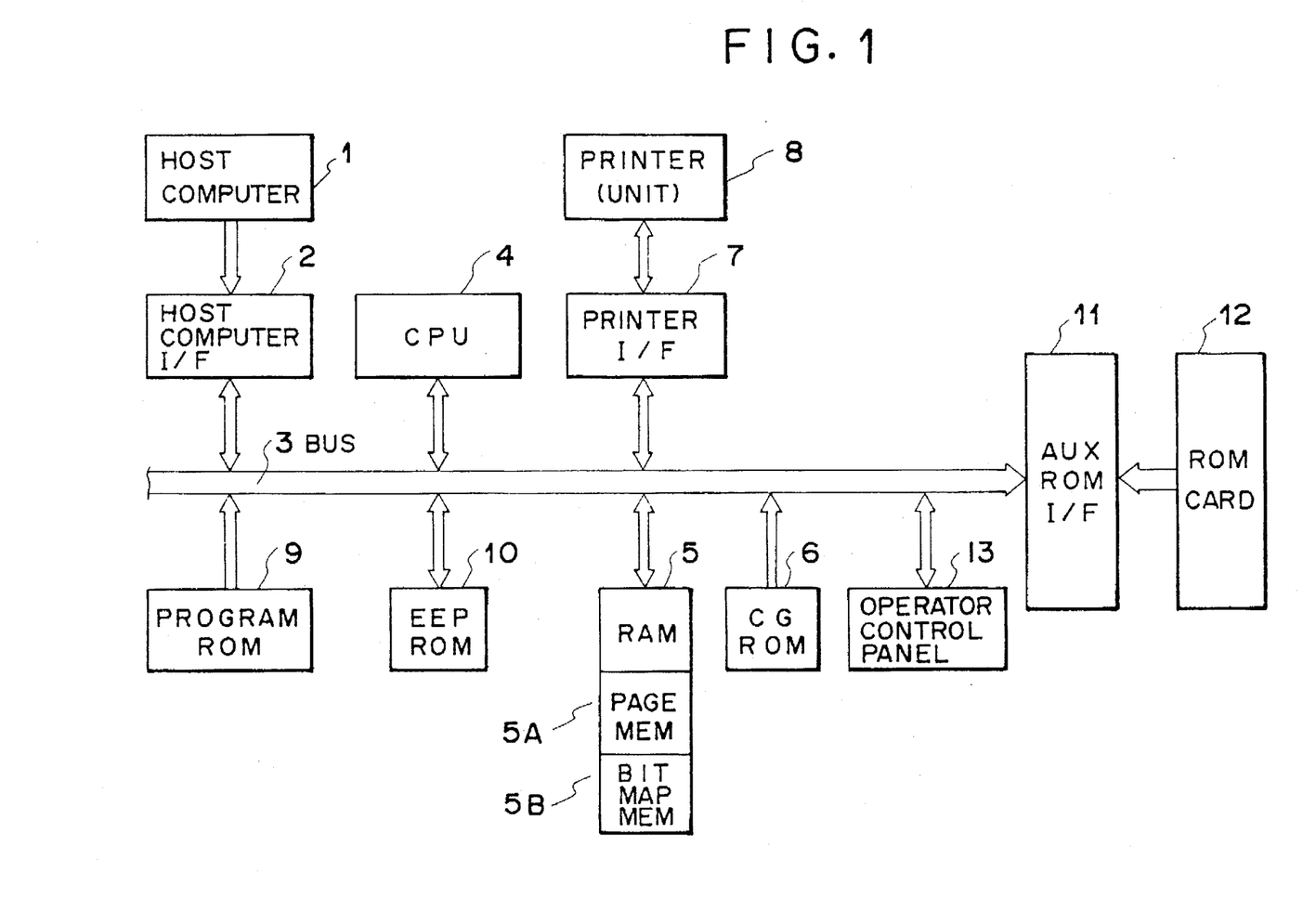
FIG. 1 is a block diagram showing the configuration of a printing apparatus according to an embodiment of the present invention.

FIG. 1 is a block diagram showing the configuration of a printing apparatus according to an embodiment of the present invention. In FIG. 1, 1 is a host computer, such as a personal computer, for outputting document data composed of character codes as the print information.

The document data is input through host computer interface portion 2 (hereinafter abbreviated as a host I/F portion 2). The host I/F portion 2 communicates with host computer 1, and transfers or accepts the data via a bus 3, to or from a central processing unit 4 (hereinafter called CPU 4).

Also, the host I/F 2 transfers or accepts data, via CPU 4 and bus 3, to or from RAM (random access memory) 5 as a readable and writable storing means.

RAM 5 serves to write and read temporary control information occurring in the course of performing control with CPU 4.

CPU 4 serves to store the document data, input through the host I/F portion 2 from the host computer 1, as character codes, and write character codes of CGROM 6 (character generator read only memory) as a dot pattern storing means, into a bit map memory 5B, within the RAM 5.

The CGROM 6 has fonts stored in the form of dot pattern, and is connected to the bus 3, to which a printer interface portion (hereinafter abbreviated as a printer I/F portion 7) is connected. The printer I/F portion 7 transfers the dot pattern stored in the CGROM 6 to a printer unit (printing unit) 8 using a laser beam method.

Further, a program ROM 9, acting as a control program storing means, is connected to the bus 3. The program ROM 9 stores a control program, with a multi task method consisting of a plurality of tasks, for controlling the whole apparatus with the CPU 4. The control program is read via the bus 3 by the CPU 4, and is stored in the apparatus, as it was prestored in the control program ROM 9, at the shipment of the apparatus from the factory.

The task management information for managing each task of the control program, and the bug corrected program transferred in the printing apparatus, are each stored in an EEPROM 10 as an electrically erasable storing means.

The task management information stored in the EEPROM 10 includes the start address of each task and the version number set for each function. The task management information is stored in the apparatus in a state as prestored in the EEPROM 10 at the time of shipment of the apparatus from the factory.

Also, the EEPROM 10 stores a memory capacity management table for managing the capacity of the storage area within the EEPROM 10, for storing the bug corrected program transferred in the printing apparatus, as previously described.

An external ROM interface portion 11 (hereinafter abbreviated as an external ROM I/F portion 11) is connected to the bus 3. The external ROM I/F portion 11 has a ROM card transfer means 12 for bug correction, mountable from outside of the printing apparatus of the present invention.

The ROM card 12, for bug correction, stores a bug correction program for transferring the bug corrected program into the printing apparatus, and correspondingly correcting the task management information and the memory capacity management table. When a bug occurs in each task of the control program, the bug corrected program can be transferred into the printing apparatus and stored in the EEPROM 10 by the bug correction program, by inserting the bug correction ROM card 12 into the external ROM I/F portion 11. Also, the start address or version number of the task management information corresponding to the bug corrected program stored in the EEPROM 10 by the bug correction program, and the memory capacity management table, are corrected.

By inserting into the external ROM I/F portion 11 a ROM card, which stores a new control program (other than the control program in the program ROM 9), as the control program storing means within the printing apparatus, as the ROM card apart from the bug correction ROM card 12, the new program stored in this ROM card (e.g., a control program in the latest version) can be read.

Also, by inserting into the external ROM I/F portion 11 a ROM card which stores fonts other than the fonts stored in the CGROM 6, as the ROM card apart from the bug correction ROM card 12, the fonts stored in the ROM card can be read.

An operation panel 13 is connected to the bus 3, and there are disposed on the operation panel 13 the operation keys for inputting various operation signals and a display means for displaying the operation conditions of the apparatus (both not shown).

The plurality of tasks constituting the control program include a host I/F task for receiving the document data from the host computer 1, a dot pattern conversion task for analyzing character codes of received document data and converting them into a dot pattern, a bit map expansion task for expanding the converted dot pattern into a bit map memory 5B within the printing apparatus, and a print task for transferring the dot pattern expanded in the bit map memory 5B to a driving unit (engine portion) for the printer portion 8.

The operation of the printing apparatus as thus constituted, according to the present invention, will be described below with reference to FIGS. 1 and 2.

First, the document data transmitted from the host computer 1 is stored, as the character code via the host I/F portion 2 and the bus 3, into a page memory 5A within the RAM 5.

The CPU 4 reads the corresponding dot pattern from the CGROM 6 and expands this dot pattern on the bit map memory 5B within the RAM 5 by referring to and analyzing the character code in the page memory 5A within the RAM 5.

After the expansion of the dot pattern onto the bit map memory 5A within the RAM 5 is completed, the CPU 4 starts the printer portion 8, via the bus 3, and the printer I/F portion 7, to transmit the dot pattern of bit map memory 5B within the RAM 5 via the printer I/F portion 7 to the printer portion 8, and print it. That is, the document data input from the host computer 1 is printed.

The control program for controlling a series of operations in the whole printing apparatus as described above is stored in the program ROM 9. Each task A to G, such as the print task, the host I/F task, and the bit map expansion task, as previously described, is executed in the multi task form, while mainly being controlled by a task management routine for each task of A, B, C, D, E, F, and G as shown in FIG. 2.

Figure 2:
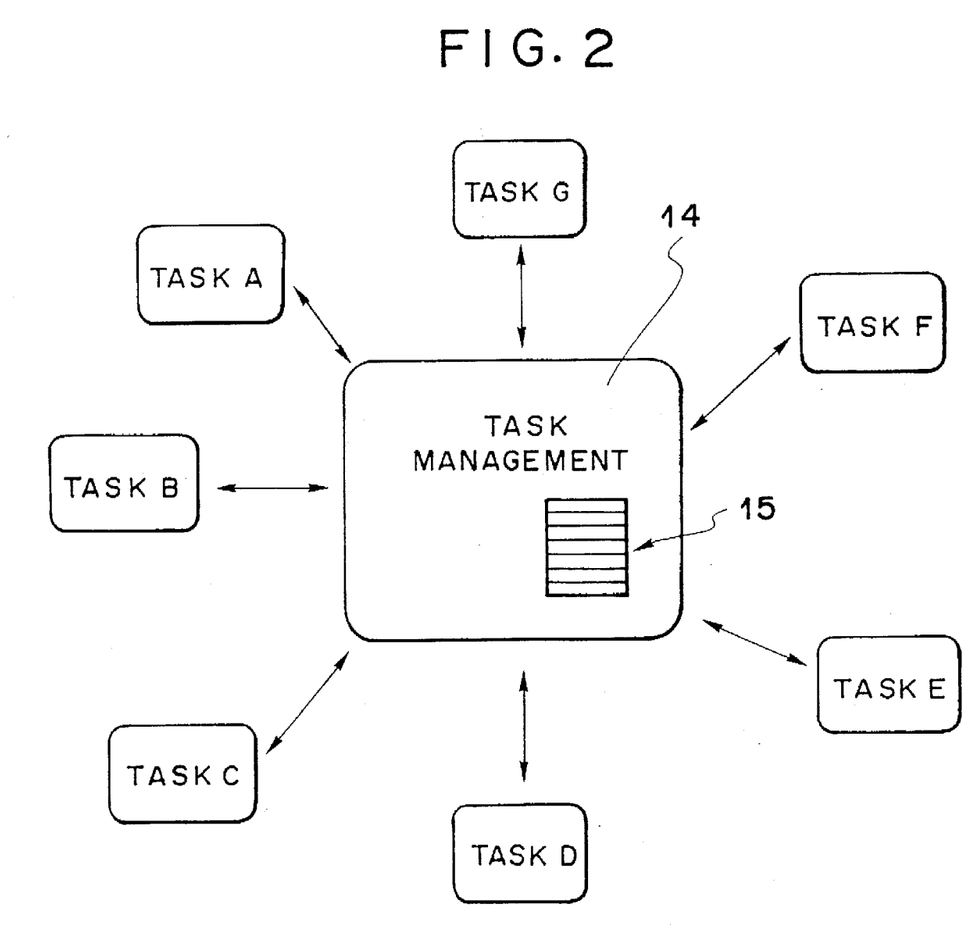
FIG. 2 is a block diagram showing the operation of each task in a control program for controlling the whole printing apparatus.

In FIG. 2, the start address (first address) or version number for each task A to G has been stored in the task management table 15 of the task management portion 14, stored in the EEPROM 10.

The task management portion 14 causes a jump to the processing for each task A to G, based on this information, if necessary.

If the user wants to use any font other than the fonts stored in the CGROM 6 of the printing apparatus of the prevent invention, it is necessary to insert a font ROM card storing the necessary font into the external ROM I/F portion 11 to read the necessary font from the font ROM card via the external ROM I/F portion 11, and after the expansion into the bit map memory 5B of the RAM 5 with the CPU 4, to print through the printer I/F portion 7 with the printer portion 8. The above ROM card is not limited to the usage for the font.

During the execution of each task A to G as shown in FIG. 2, when a bug is detected in task C, for example, the serviceman goes to the user's site, taking with him a bug correction ROM card 12 which stores the bug correction program for insertion into a connector (not shown) in the external ROM I/F portion 11 of the printing apparatus, in order to correct the bug in task C.

This ROM card 12 has a structure of being readily inserted from outside of the printing apparatus.

After turning off the power of the printing apparatus, the serviceman inserts the bug correction ROM card 12 into the connector of the external ROM I/F portion 11, as described above, and turns on the power of the printing apparatus again.

Figure 6:
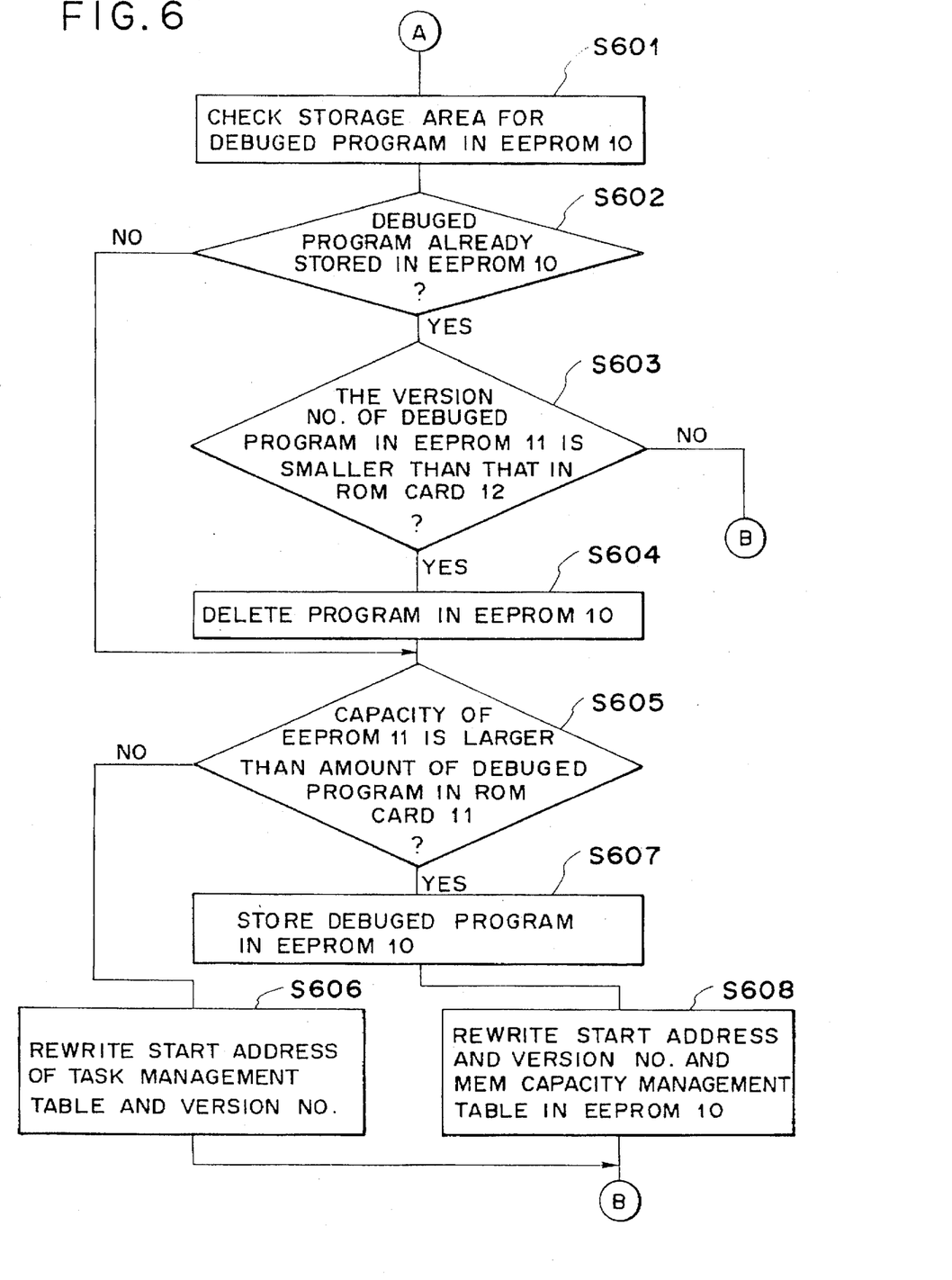
FIG. 6 is an additional flowchart showing the operation of the embodiment as shown in FIG. 1.
Figure 7:
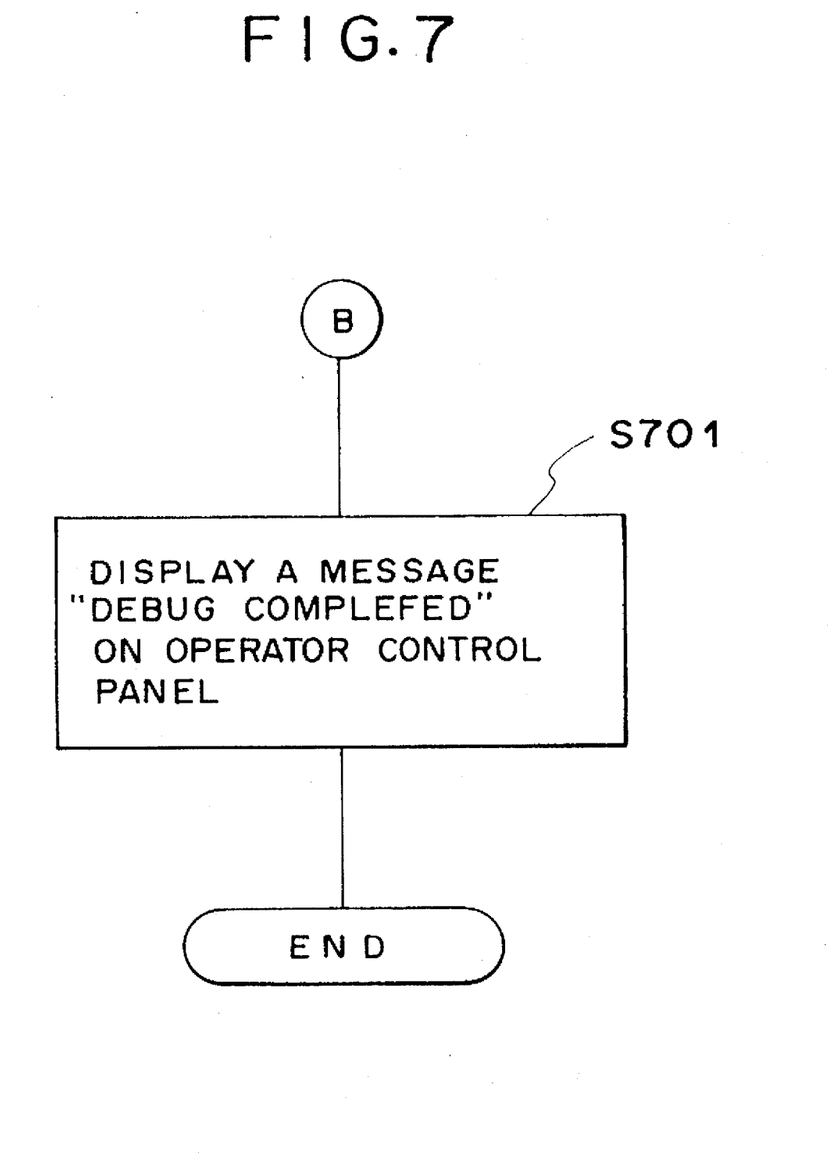
FIG. 7 is still an additional flowchart showing the operation of the embodiment as shown in FIG. 1.

Referring now to flowcharts of FIGS. 5 to 7, the operation of this embodiment will be described. It should be noted that the control program based on the flowcharts is stored in the program ROM 9 and the EEPROM 10, and is controlled by the CPU 4.

Figure 5:
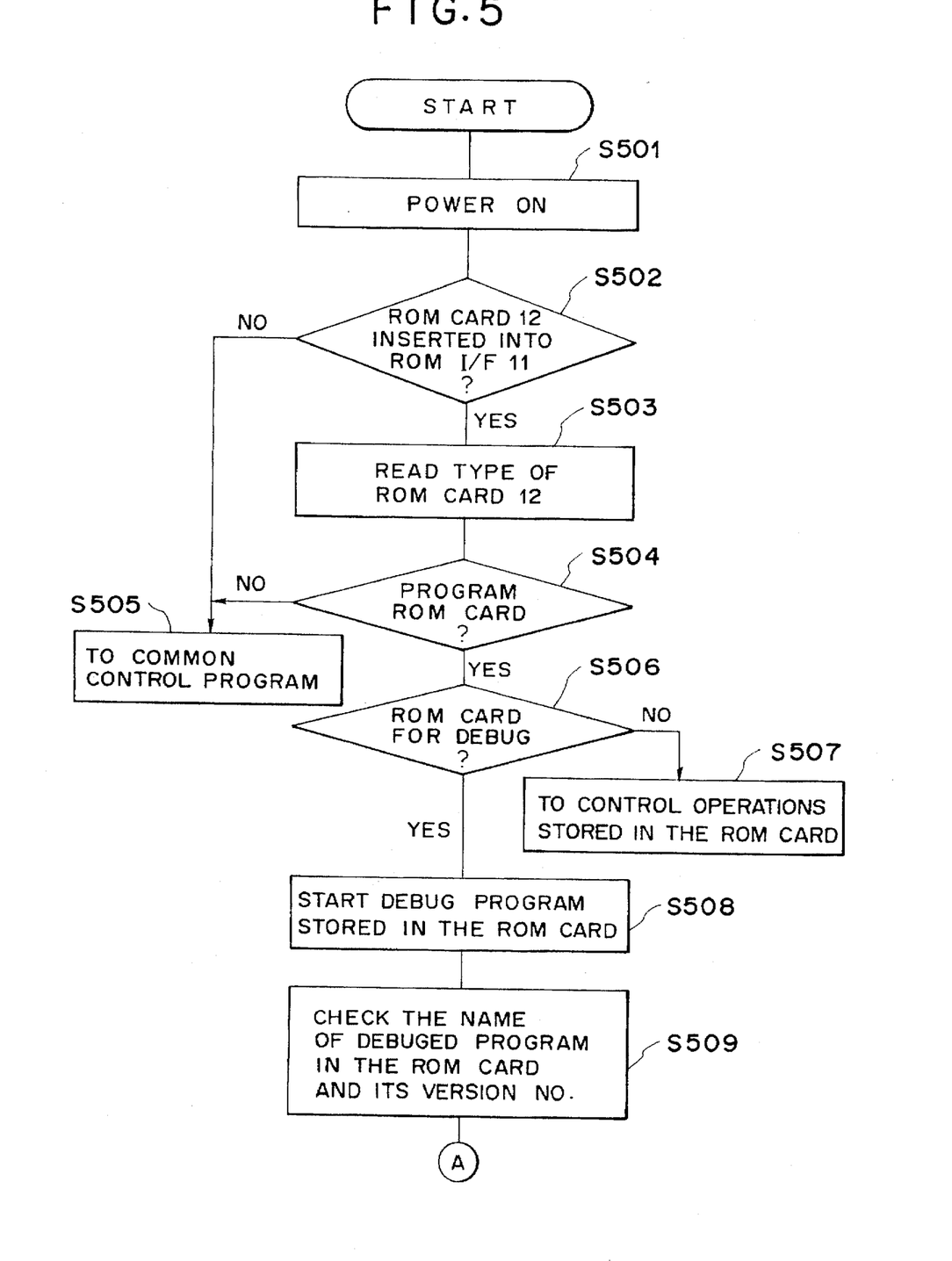
FIG. 5 is a flowchart showing the operation of the embodiment as shown in FIG. 1.

In FIG. 5, if the power supply of the printing apparatus is turned on (501), the CPU 4 of the printing apparatus first accesses the external ROM I/F 11 to check whether a ROM card 12 is inserted into the ROM I/F 11 (502).

If the ROM card 12 is not inserted, the operation transfers to a common control program (505). If the ROM card 12 is inserted, the type of the ROM card 12 is read (503).

This is achieved by reading the information indicating the type of the ROM card (ROM card for storing a program, or ROM card for storing data such as fonts) stored in some ROM area in the ROM card 12.

As a result, if the above ROM card 12 is not a ROM card storing a program (504), the operation transfers to common control program (505). If it is a ROM card storing a program (504), a check is performed to determine whether it is a bug correction ROM card relating to the present invention (506).

If it is not a bug correction ROM card, the operation transfers to a program for the ROM card.

If it is a bug correction ROM card, the bug correction program within the ROM card is started.

The above described bug correction program first checks the bug corrected program name within the ROM card 12 and its version number (509).

Then, it also checks the storage area of the bug corrected program with the bug corrected, based on the memory capacity table within the EEPROM 10 (601).

If the bug corrected program with the bug corrected is already stored in the EEPROM 10 (602), the version number of the bug corrected program is then checked (603). If the version number is the same as that of the bug corrected program within the ROM card, the bug corrected program is terminated because bug correction is unnecessary.

If the version number is older than that of the bug corrected program within the ROM card 12 (603), the bug corrected program within the EEPROM 10 is erased (604), and the storable capacity for the bug corrected program is checked based on the memory capacity table within the EEPROM 10 (605).

If the bug corrected program is not stored in the EEPROM 10, the above procedure is omitted and the operation transfers to 605.

At 605, a check is performed to determine whether the storable capacity for the bug corrected program within the EEPROM 10 is greater than the capacity of the bug corrected program within the ROM card 12 based on the memory capacity management table. If it is greater, the storing operation of the bug corrected program is performed (607) as it can be stored into the EEPROM 10, and then the start address and the version number for the bug corrected program within the EEPROM 10, as well as the content of the memory capacity management table, are rewritten (608). A message indicating the termination of bug correction is displayed on the operation panel 13 and the operation is ended (701).

At 605, if the storable capacity for the bug corrected program within the EEPROM 10 is smaller than the capacity of the bug corrected program within the ROM card 12, the bug corrected program is not stored in the EEPROM 10, and in a state in which the bug correction ROM card 12 is inserted, the start address of the task management table within the EEPROM 10 as shown in FIG. 1 is rewritten with the start address of the bug corrected program within the ROM card 12, and the version number is also rewritten (606). Then a message indicating the termination of bug correction is displayed on the operation panel 13, and the operation is ended (701).

In this way, if the start address corresponding to the bug corrected program of a task for which the bug is corrected, among the tasks of the task management information stored in the EEPROM 10, has been rewritten, the power supply of the printing apparatus is turned off, and after the bug correction ROM card is extracted, the power supply of the printing apparatus is turned on again.

Thus, the whole printing apparatus is controlled based on a bug corrected program (a new control program) having the bug corrected for a program containing the bug to be corrected (e.g., task), and the control program which is not a subject of the bug correction prestored in the printing apparatus, as above described.

While the serviceman performs a bug correction operation by inserting the bug correction ROM card 12 into the external ROM I/F portion 11 in the above-described embodiment, the bug correction operation may be performed by the user, rather than the serviceman, in which in which case a bug correction ROM card 12 is delivered to the user beforehand, and the user inserts the bug correction ROM card 12 into the external ROM I/F portion 11, if necessary.

Figure 3:
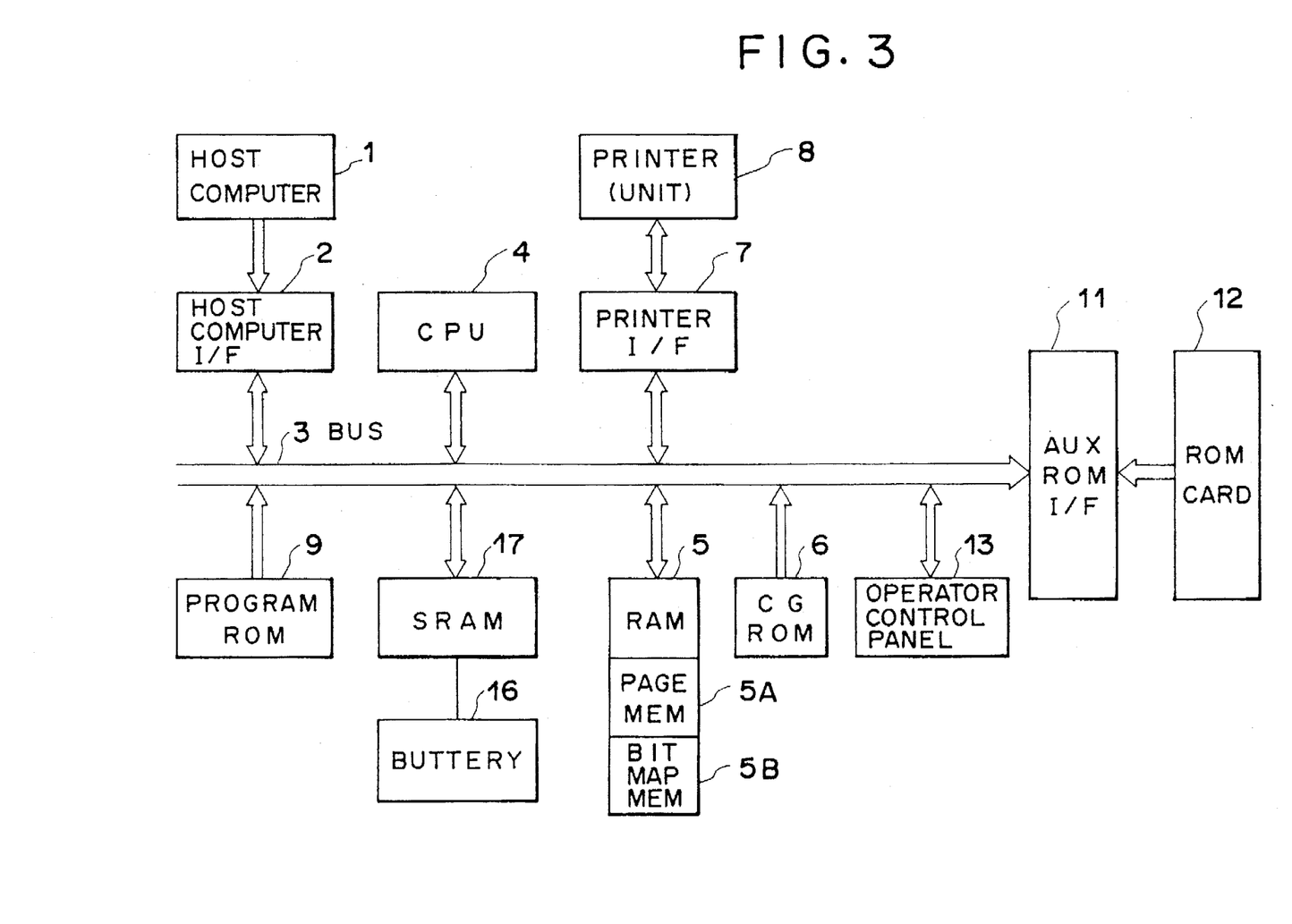
FIG. 3 is a block diagram showing the configuration of a printing apparatus according to another embodiment of the present invention.

FIG. 3 is a block diagram showing the configuration of a printing apparatus according to another embodiment of the present invention. In this embodiment, a SRAM (Static Random Access Memory) 17 having a battery 16 for the back-up is used (rather than the EEPROM 10 used in the previous embodiment of FIG. 1), whereby the bug corrected program can be rewritten into the SRAM 17, as in the previous embodiment of FIG. 1, while the SRAM 17 has a greater memory capacity than the EEPROM 10.

Since other constitutions in the embodiment of FIG. 3 are the same as those in the previous embodiment of FIG. 1, the like parts have the like numerals in the drawings, of which the explanation will be omitted.

Figure 4:
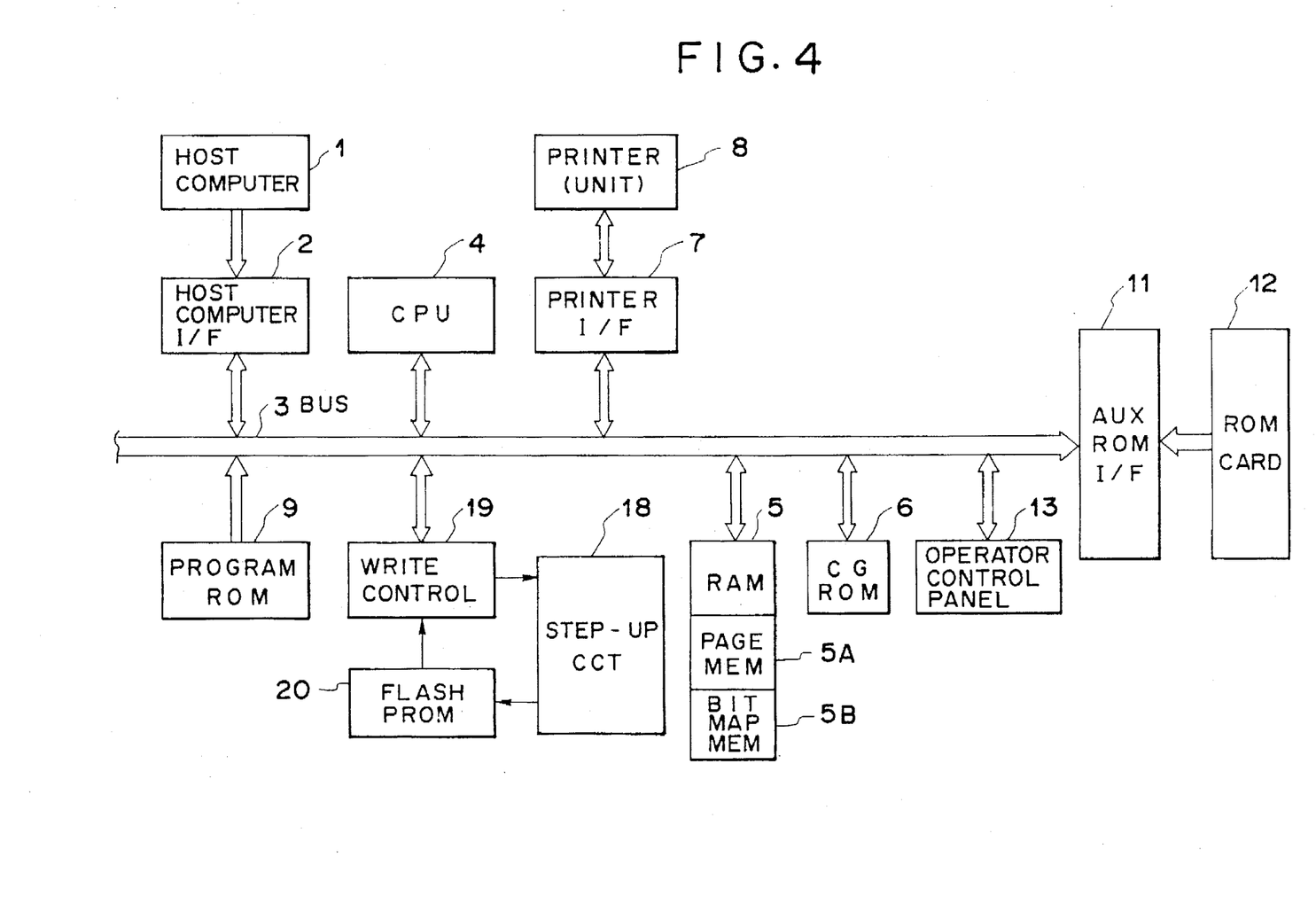
FIG. 4 is a block diagram showing the configuration of a printing apparatus according to still another embodiment of the present invention.

FIG. 4 is a block diagram showing the configuration of the printing apparatus according to still another embodiment of the present invention. In this embodiment, the like parts also have the like numerals as in the previous embodiment of FIG. 1, and the duplicate explanation is avoided and different portions will be mainly described.

As will be seen from the comparison between FIG. 1 and FIG. 4, a step-up circuit 18 for generating a voltage (12V) for writing, a writing control portion 19, and a flash PROM 20, instead of the EEPROM 10, are used in FIG. 4.

In this embodiment, the flash PROM 20 has a greater capacity than the EEPROM 10 of FIG. 1, and does not require any battery 16 for the back-up, as required with the SRAM 17. Other portions are the same as in FIG. 1.

Furthermore, the transfer means used the bug correction ROM card, but is not limited to it. And the bug correction can be also made by transferring a bug correction program to the printing apparatus.

What is claimed is:

1. An information processing apparatus comprising:
    determination means for determining whether data stored in a first memory detachably connected to said apparatus comprises a revised program; and
    control means for
        (a) discriminating whether the revised program can be stored in a second memory if said determination means determines that the data stored in the first memory comprises the revised program,
        (b-1) controlling said apparatus based on the revised program and a control program stored in a third memory without storing the revised program in the second memory if it is discriminated that the revised program cannot be stored in the second memory,
        (b-2) controlling the second memory to store the revised program and controlling said apparatus based on the revised program stored in the second memory and the control program stored in the third memory if it is discriminated that the revised program can be stored in the second memory, and
        (c) controlling said apparatus based on the data stored in the first memory and the control program stored in the third memory if said determination means determines that the data stored in the first memory does not comprise the revised program.

2. An apparatus according to claim 1, wherein the data stored in the first memory comprises the revised program or font data.

3. An apparatus according to claim 1, wherein the third memory comprises a read-only-memory.

4. An information processing method comprising the steps of:
    determining whether data stored in a first memory detachably connected to an apparatus comprises a revised program; and
    controlling the apparatus by:
        (a) discriminating whether the revised program can be stored in a second memory if said determination step determines that the data stored in the first memory comprises the revised program, (b-1) if it is discriminated that the revised program cannot be stored in the second memory, controlling the apparatus based on the revised program and a control program stored in a third memory without storing the revised program in the second memory;

(b-2) if it is discriminated that the revised program can be stored in the second memory, controlling the second memory to store the revised program and controlling the apparatus based on the revised program stored in the second memory and the control program stored in the third memory; and (c) if it is determined in the determining step that the data stored in the first memory does not comprise the revised program, controlling the apparatus based on the data stored in the first memory and the control program stored in the third memory.

5. A method according to claim 4, wherein the data stored in the first memory comprises the revised program or font data.

6. A method according to claim 4, wherein the third memory comprises a read-only-memory.

7. A computer usable medium having stored computer readable instruction codes for an information processing apparatus comprising:

a first set of computer readable instruction codes for determining whether data stored in a first memory detachably connected to said apparatus comprises a revised program; and a second set of computer readable instruction codes for controlling the apparatus including:

a third set of computer readable instruction codes for discriminating whether the revised program can be stored in a second memory if said determination determines that the data stored in the first memory comprises the revised program, a fourth set of computer readable instruction codes for controlling said apparatus based on the revised program and a control program stored in a third memory without storing the revised program in the second memory if it is discriminated that the revised program cannot be stored in the second memory, a fifth set of computer readable instruction codes for controlling the second memory to store the revised program and controlling said apparatus based on the revised program stored in the second memory and the control program stored in the third memory if it is discriminated that the revised program can be stored in the second memory, and a sixth set of computer readable instruction codes for controlling said apparatus based on the data stored in the first memory and the control program stored in the third memory if said determination determines that the data stored in the first memory does not comprise the revised program.

8. An apparatus according to claim 7, wherein the data stored in the first memory comprises the revised program or font data.

9. An apparatus according to claim 7, wherein the third memory comprises a read-only-memory.

* * * * *

UNITED STATES PATENT AND TRADEMARK OFFICE
CERTIFICATE OF CORRECTION

PATENT NO.   : 5,742,742
DATED        : April 21, 1998
INVENTOR(S)  : SHIGERU UEDA It is certified that error appears in the above-identified patent and that said Letters Patent is hereby corrected as shown below:

IN THE DRAWINGS

Sheet 3, FIG. 3, "BUTTERY" should read --BATTERY--;
Sheet 5, FIG. 5, "DEBUGED" should read --DEBUGGED--;
Sheet 6, FIG. 6, "DEBUGED" (five occurrences) should read --DEBUGGED--; and
Sheet 7, FIG. 7, "COMPLEFED" should read --COMPLETED--.

COLUMN 4

Line 9, "EMBODIMENT" should read --EMBODIMENTS--.

COLUMN 6

Line 13, "prevent" should read --present--.

COLUMN 7

Line 59, "in which" should be deleted.

UNITED STATES PATENT AND TRADEMARK OFFICE
CERTIFICATE OF CORRECTION

PATENT NO. : 5,742,742
DATED : April 21, 1998
INVENTOR(S) : SHIGERU UEDA

It is certified that error appears in the above-identified patent and that said Letters Patent is hereby corrected as shown below:

<u>COLUMN 8</u>

Line 24, "used" should read --uses--.

Signed and Sealed this

Twenty-fourth Day of November, 1998

BRUCE LEHMAN

Attest:

Attesting Officer    Commissioner of Patents and Trademarks